United States Patent
Storrs et al.

(10) Patent No.: US 7,875,228 B2
(45) Date of Patent: Jan. 25, 2011

(54) APPARATUS, SYSTEM, AND METHOD FOR MAINTAINING PART ORIENTATION DURING MANUFACTURING

(75) Inventors: Bart J. Storrs, Saratoga Springs, UT (US); Michael A. Griffin, South Jordan, UT (US)

(73) Assignee: SG Design Technologies, Saratoga Springs, UT (US)

( * ) Notice: Subject to any disclaimer, the term of this patent is extended or adjusted under 35 U.S.C. 154(b) by 519 days.

(21) Appl. No.: 11/420,703

(22) Filed: May 26, 2006

(65) Prior Publication Data

US 2007/0271777 A1 Nov. 29, 2007

(51) Int. Cl.
*B28B 3/06* (2006.01)
*B28B 5/00* (2006.01)
*B28B 1/14* (2006.01)
*B29C 39/00* (2006.01)
*B29C 41/00* (2006.01)
*H01R 43/00* (2006.01)

(52) U.S. Cl. ............... 264/297.1; 264/297.2; 264/299; 29/827

(58) Field of Classification Search .............. 29/827; 264/297.1, 297.2, 259, 299
See application file for complete search history.

(56) References Cited

U.S. PATENT DOCUMENTS

| | | | | |
|---|---|---|---|---|
| 2,584,916 A * | 2/1952 | Poux | | 264/161 |
| 4,008,302 A * | 2/1977 | Erlichman | | 264/156 |
| 4,230,387 A * | 10/1980 | Zahn | | 439/590 |
| 4,586,607 A * | 5/1986 | Dubbs et al. | | 206/716 |
| 4,617,733 A * | 10/1986 | Olson | | 29/874 |
| 5,019,209 A * | 5/1991 | Hiraide et al. | | 216/14 |
| 5,148,596 A * | 9/1992 | Zahn | | 29/842 |
| 5,207,966 A * | 5/1993 | Adkins et al. | | 264/250 |
| 5,337,468 A * | 8/1994 | Zahn | | 29/842 |
| 5,428,890 A * | 7/1995 | Zahn | | 29/867 |
| 5,478,051 A * | 12/1995 | Mauer | | 264/156 |
| 5,616,053 A * | 4/1997 | Bogursky et al. | | 439/590 |
| 5,619,794 A * | 4/1997 | Hokazono | | 29/883 |
| 5,725,392 A * | 3/1998 | Bianca et al. | | 439/590 |
| 5,775,945 A * | 7/1998 | Bianca et al. | | 439/590 |
| 5,830,012 A * | 11/1998 | Ortega et al. | | 439/590 |
| 5,927,373 A * | 7/1999 | Tobin | | 164/36 |
| 5,967,841 A * | 10/1999 | Bianca et al. | | 439/590 |
| 6,146,199 A * | 11/2000 | Ortega et al. | | 439/590 |
| 6,344,160 B1 * | 2/2002 | Holtzberg | | 264/102 |

(Continued)

OTHER PUBLICATIONS

PCT/US2007/069687, International Preliminary Report on Patentability, Mar. 12, 2009.

(Continued)

*Primary Examiner*—A. Dexter Tugbang
*Assistant Examiner*—David P Angwin
(74) *Attorney, Agent, or Firm*—Kunzler Needham Massey & Thorpe (57) ABSTRACT

An apparatus, system, and method are disclosed for maintaining orientation of a manufactured part during a manufacturing process. The apparatus, system, and method include uncoiling a carrier from at least one supply reel and feeding the carrier into a manufacturing machine used by a manufacturing process to form a manufactured part. The apparatus, system, and method include forming the manufactured part onto at least one prong protruding from the carrier. The at least one prong and the carrier maintain orientation of the manufactured part with respect to the carrier.

15 Claims, 6 Drawing Sheets

U.S. PATENT DOCUMENTS

| | | | |
|---|---|---|---|
| 7,037,761 B2* | 5/2006 | Hedler et al. | 438/127 |
| 7,134,197 B2* | 11/2006 | Shiffer et al. | 29/840 |
| 7,556,759 B2* | 7/2009 | Hiemstra et al. | 264/297.1 |
| 2002/0195701 A1* | 12/2002 | Bemmerl et al. | 257/706 |
| 2004/0051205 A1* | 3/2004 | Bouquet et al. | 264/234 |
| 2004/0093721 A1* | 5/2004 | Watson | 29/729 |
| 2004/0154529 A1* | 8/2004 | Nogiwa et al. | 117/200 |
| 2004/0233647 A1* | 11/2004 | Ogawa et al. | 361/752 |
| 2005/0037543 A1* | 2/2005 | Tsumura et al. | 438/123 |
| 2005/0136569 A1* | 6/2005 | Shiffer et al. | 438/107 |
| 2006/0208583 A1* | 9/2006 | Ueno et al. | 310/71 |

OTHER PUBLICATIONS

PCT/US2007/069687, International Search Report and Written Opinion, Sep. 29, 2008.

* cited by examiner

APPARATUS, SYSTEM, AND METHOD FOR MAINTAINING PART ORIENTATION DURING MANUFACTURING

BACKGROUND OF THE INVENTION

1. Field of the Invention

This invention relates to manufacturing of parts and more particularly relates to maintaining orientation of parts during manufacturing.

2. Description of the Related Art

Injection molding, cast metal fabricating, metal stamping, and other manufacturing processes often require multiple steps. For example a manufactured part may be initially formed during one step of a manufacturing process. In another step of the manufacturing process, the manufactured part may be painted, plated, silk screened with a logo, machined, placed in an assembly, or other process. Often parts are created by forming the part in a manufacturing machine using some sort of mold or dye.

For example raw plastic is fed into an injection molding machine and the mold is filled with raw plastic through a sub-gate into a mold. Once plastic has filled the mold, the injection molding machine opens the mold and the manufactured part falls into a bin. The manufactured part loses orientation as it falls into the bin. Parts formed using a cast metal process, a stamped metal process, and the like may also be dropped into a bin after the parts are formed.

Where the manufacturing process involves another step, the manufactured parts must be reoriented into a position for another machine to place the part, silkscreen a logo onto the part, place the part in a container for shipping, plate a portion of the part, etc. Manually reorienting manufactured parts is usually labor intensive or may involve an expensive machine to pick the parts or vibrate the parts into a correct position.

Another way to maintain orientation of manufactured parts may involve some type of conveyer belt, assembly line, or the like. Parts may be moved onto a conveyer right from the manufacturing machine that formed the part. Moving the manufactured parts without losing orientation of the part may be tricky and expensive. In addition, conveyers, assembly lines, etc. may also be expensive.

From the foregoing discussion, it should be apparent that a need exists for an apparatus, system, and/or method that maintain orientation of a manufactured part throughout a manufacturing process. Beneficially, such an apparatus, system, and method would provide a carrier that would allow a manufactured part to be formed onto prongs of the carrier. The carrier may be uncoiled from a reel into a manufacturing machine and then coiled onto another reel with the manufactured parts held in a correct orientation.

SUMMARY OF THE INVENTION

The present invention has been developed in response to the present state of the art, and in particular, in response to the problems and needs in the art that have not yet been fully solved by currently available manufacturing methods. Accordingly, the present invention has been developed to provide an apparatus, system, and method for maintaining orientation of a manufactured part during a manufacturing process that overcome many or all of the above-discussed shortcomings in the art.

A method of the present invention is presented for maintaining orientation of a manufactured part during a manufacturing process. The method in the disclosed embodiments substantially includes the steps necessary to carry out the functions presented below with respect to the operation of the described system and apparatus. In one embodiment, the method includes uncoiling a carrier from at least one supply reel. The method includes feeding the carrier into a manufacturing machine used by a manufacturing process to form a manufactured part. The method includes forming the manufactured part onto at least one prong protruding from the carrier; the at least one prong and the carrier configured to maintain orientation of the manufactured part with respect to the carrier.

In one embodiment, the method includes coiling the carrier, the at least one prong, and the manufactured part formed onto the at least one prong onto a take-up reel. The take-up reel accommodates the carrier, the at least one prong, and the manufactured part while maintaining orientation of the manufactured part. In another embodiment, at least a portion of the manufacturing process comprises an injection molding process. In another embodiment, at least a portion of the manufacturing process comprises a cast metal process.

In one embodiment, the carrier includes a top carrier and a bottom carrier and the top and bottom carriers each comprise at least one prong protruding from the carriers. In a further embodiment, the top carrier uncoils from a first supply reel and the bottom carrier uncoils from a second supply reel. In an alternate embodiment, the top carrier and the bottom carrier uncoil from one supply reel. In another embodiment, the manufactured part is formed on at least one prong protruding from the top carrier and at least one prong protruding from the bottom carrier. In one embodiment, the carrier is a wire. In another embodiment, the carrier is a flat strip of metal. In another embodiment, the carrier is a polymeric material.

In one embodiment, the carrier further includes an indexing mechanism that facilitates advancing the carrier to a predetermined location in the manufacturing machine to form the manufactured part onto at least one prong. The indexing mechanism, in another embodiment, includes one or more indexing holes in the carrier. In a further embodiment, the indexing holes are used by an encoder. In another embodiment, the method includes uncoiling the carrier, the at least one prong, and the manufactured part into a second manufacturing machine for further processing of the manufactured part. In another embodiment, the further processing includes a silk screening process, a painting process, a plating process, or an assembly process. The method, in another embodiment, includes uncoiling the carrier, the at least one prong, and the manufactured part into a trimming and placement assembly that trims the manufactured part from the carrier and at the least one prong and places the manufactured part.

A system of the present invention is also presented to maintain orientation of a manufactured part during a manufacturing process. The system includes a manufacturing machine used by a manufacturing process, at least one supply reel, a take-up reel, and a carrier configured to uncoil from the at least one supply reel into the manufacturing machine and to coil onto the take-up reel. The system also includes at least one prong protruding from the carrier. The at least one prong and the carrier configured to maintain orientation of a manufactured part with respect to the carrier. The manufactured part is formed by the manufacturing machine onto the at least one prong.

The system may further include a reel holder assembly that positions the at least one supply reel on one side of the manufacturing machine and to position the take-up reel on a second side of the manufacturing machine. In another embodiment, the at least one supply reel and the take-up reel are positioned vertically with respect to the manufacturing machine to feed the carrier and the at least one prong vertically into the manufacturing machine and to coil the carrier, the at least one prong, and the manufactured part vertically from the manufacturing machine.

An apparatus to maintain orientation of a manufactured part during a manufacturing process is provided and includes a carrier that uncoils from at least one supply reel into a manufacturing machine used by a manufacturing process and coils onto a take-up reel from the manufacturing machine. The apparatus includes at least one prong protruding from the carrier. The at least one prong and the carrier maintain orientation of a manufactured part with respect to the carrier. The manufactured part is formed onto the at least one prong by the manufacturing machine. In one embodiment, the carrier includes an indexing mechanism configured to facilitate advancing the carrier to a predetermined location in the manufacturing machine to form the manufactured part onto at least one prong.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5:
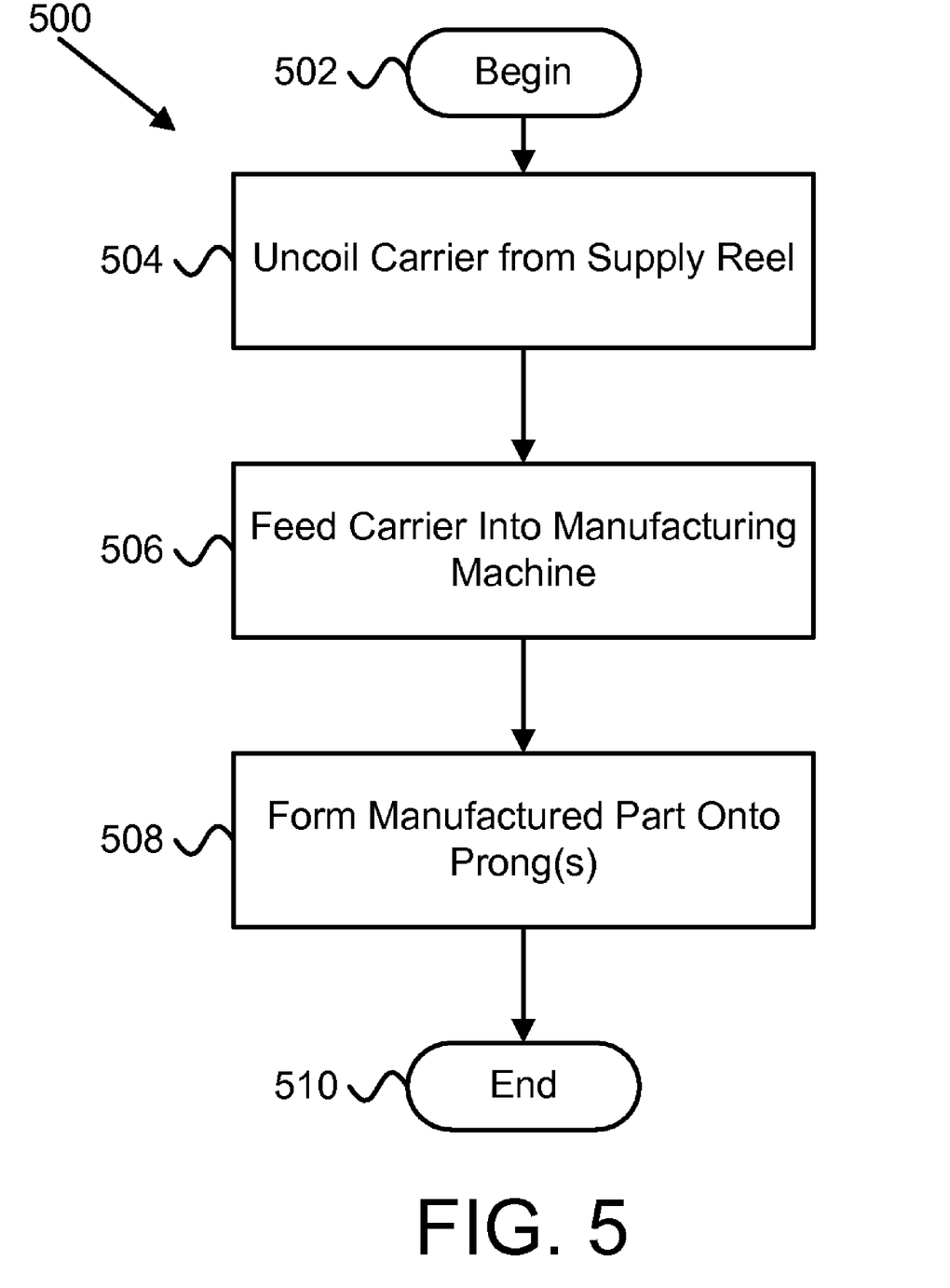
FIG. 5 is a schematic flow chart diagram illustrating one embodiment of a method for maintaining orientation of a manufactured part during a manufacturing process in accordance with the present invention.
Figure 6:
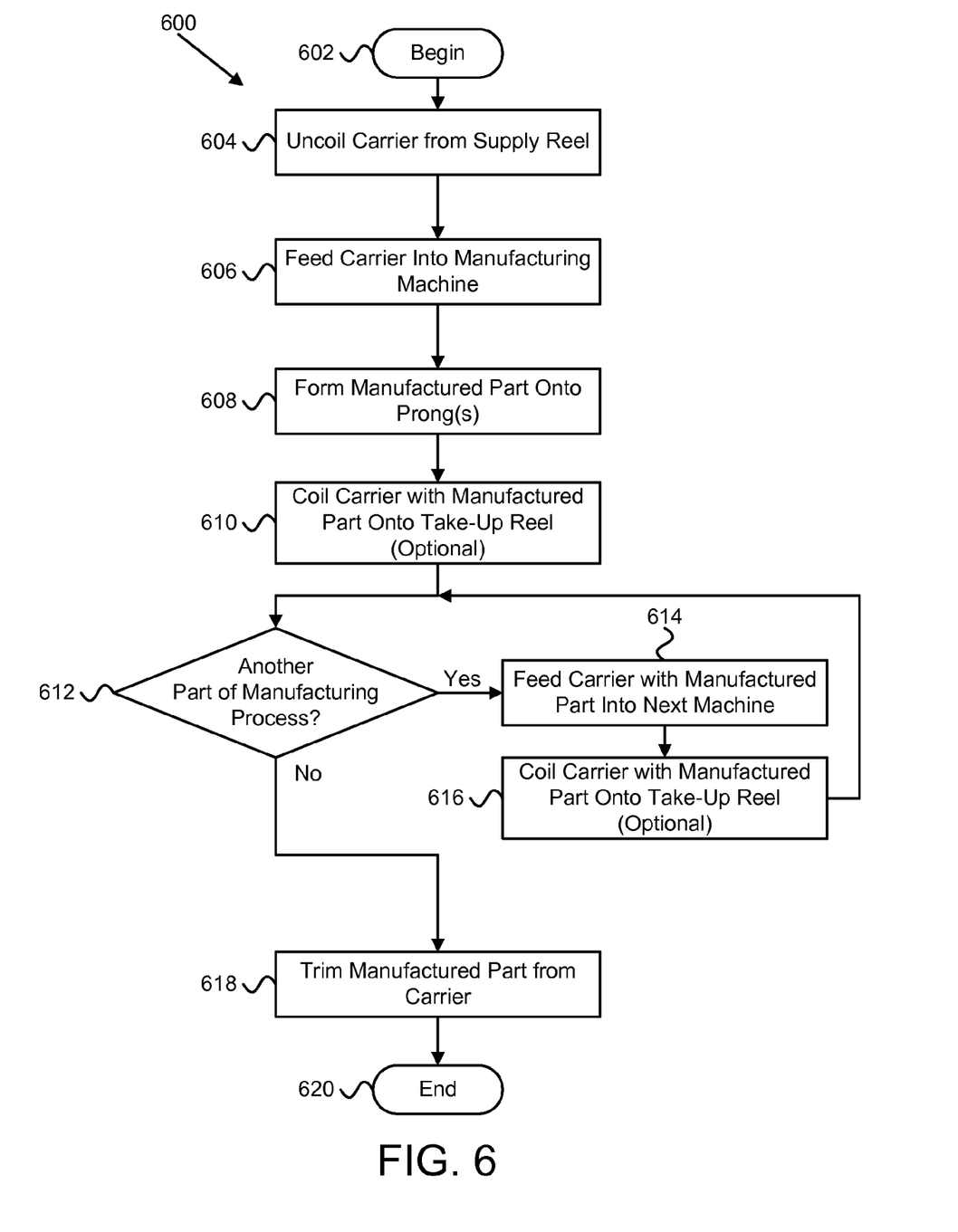
FIG. 6 is a schematic flow chart diagram illustrating another embodiment of a method for maintaining orientation of a manufactured part during a manufacturing process in accordance with the present invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
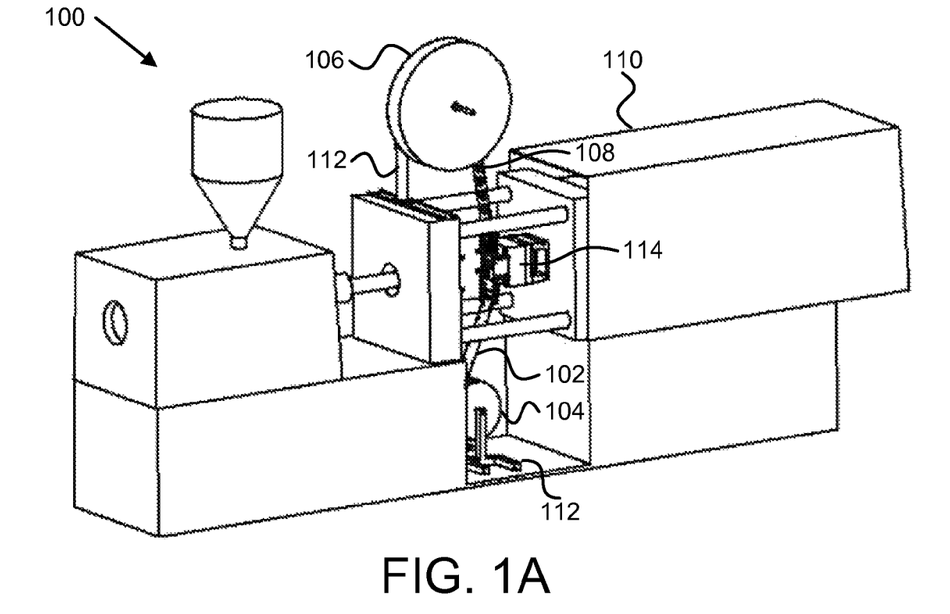
FIG. 1A is a schematic block diagram illustrating one embodiment of a system for maintaining orientation of a manufactured part during a manufacturing process in accordance with the present invention.
Figure 1B:
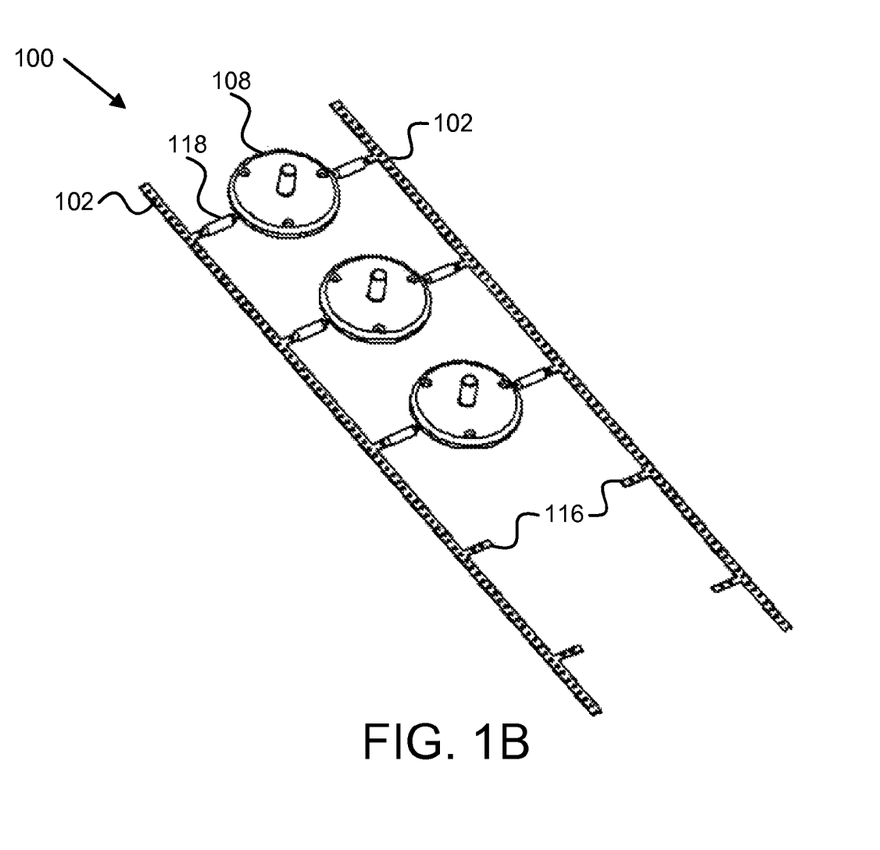
FIG. 1B is a schematic block diagram illustrating a more detailed view of the embodiment of a system for maintaining orientation of a manufactured part during a manufacturing process in accordance with the present invention.
Figure 1C:
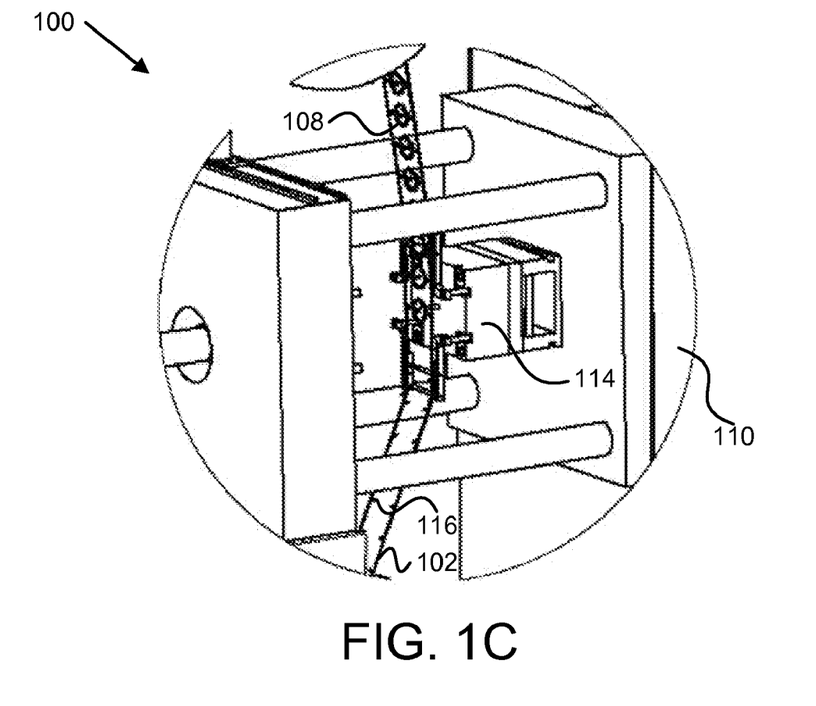
FIG. 1C is a schematic block diagram illustrating another detailed view of the embodiment of a system for maintaining orientation of a manufactured part during a manufacturing process in accordance with the present invention.

FIG. 1A is a schematic block diagram illustrating one embodiment of a system 100 for maintaining orientation of a manufactured part during a manufacturing process in accordance with the present invention. FIGS. 1B and 1C are more detailed views of the embodiment of the system 100. The system 100 includes a carrier 102, at least one supply reel 104, a take-up reel 106, a manufactured part 108, a manufacturing machine 110, a reel holder assembly 112, a mold 114, prongs 116, and a connector 118, which are described below.

The system 100 includes a carrier 102 that uncoils from at least one supply reel 104 into the manufacturing machine 110 and that coils onto a take-up reel 106. The carrier 102 also includes at least one prong 116 protruding from the carrier 102. The prong 116 and the carrier 102 are configured to maintain orientation of a manufactured part 108 with respect to the carrier 102. The carrier 102 may be made of metal, plastic, fiber, clothe, paper, or any other material capable of coiling and uncoiling from reels 104, 106 and having a prong 116 protruding from the carrier 102. The carrier 102 is typically flexible and may be a wire, a metal strip, a strip of plastic, a strip of cardboard, a composite material, or the like. A carrier 102 may be of various sizes and dimensions to physically support manufactured parts 108 of various sizes and weights. For example, a heavy or large manufactured part 108 may require a stronger carrier 102 than a small or light manufactured part 108.

The carrier 102, in one embodiment, includes a single carrier 102 with prongs 116. In another embodiment, the carrier 102 includes a top carrier 102 and a bottom carrier 102 with prongs 116 on both carriers 102 (as depicted in FIG. 1B). In another embodiment, a carrier 102 includes prongs 116 extending in more than one direction and may be used as a top carrier 102, a bottom carrier 102, a middle carrier 102, etc. to maintain orientation of manufactured parts 108 above, below, and in between one or multiple carriers 102. In another embodiment, rows of carriers 102 may support manufactured parts 108 in one or more dimensions. One of skill in the art will recognize other materials and shapes used to form a carrier 102 and recognize other carrier 102 configurations capable of coiling and uncoiling from reels 104, 106 and containing prongs 116 for receiving a manufactured part 108.

The manufactured part 108 is formed by the manufacturing machine 110 onto at least one prong 116 of the carrier 102. The portion of the manufactured part 108 that forms on a prong 116 is referred to herein as a connector 118. In one embodiment, material used to form a manufactured part 108 is injected onto a prong 116, such as in an injection molding or cast metal process. In another embodiment, material used to form a manufactured part 108 is formed around a prong 116, such as in a stamped metal process. In yet another embodiment, a material is formed on or around a prong 116 where the material differs from that used to form a manufactured part 108 and serves only as a connector 118 from the manufactured part 108 to a prong 116.

Prongs 116 may be of various sizes and shapes and may be positioned on a carrier 102 at different spacings to accommodate different manufactured parts 108. A manufactured part 108 may be formed onto one or more prongs 116 of a carrier 102. For example a manufactured part 108 may be formed onto a prong 116 of a top carrier 102 and a prong 116 of a bottom carrier 102 (as depicted in FIG. 1B). In another example, a manufactured part 108 may be formed onto two prongs 116 of a carrier 102. One of skill in the art will recognize other ways to form a manufactured part 108 to create a connector 118 onto a prong 116.

The system 100 includes at least one supply reel 104 from which a carrier 102 with prongs 116 may uncoil. Supply reels 104 may come in various sizes and dimensions to accommodate various manufactured parts 108. In one embodiment, a supply reel 104 accommodates a single carrier 102. In such an embodiment, multiple supply reels 104, each containing a carrier 102, may be used together in the system 100. For example a top carrier 102 and a bottom carrier 102, each on separate supply reels 104, may be used and oriented so the prongs 116 extend toward a center so that a manufactured part 108 may be formed onto to opposing prongs 116 (as depicted in FIG. 1B).

In another embodiment, a supply reel 104 contains multiple carriers 102. The supply reel 104 may or may not include channels or guides to hold the multiple carriers 102. In another embodiment, prongs 116 of the carriers 102 include a wire or other material between prongs 116 that may be either trimmed from the prongs 116 prior to forming a manufactured part 108 onto the prongs 116 or may remain between the prongs 116 to become an integral part of the manufactured part 108. In yet another embodiment, wire or other material may extend between carriers 102 and may form a prong 116. For example, a wire may extend between carriers 102 that may become part of an electronic device. The carriers 102 with wire in between may be coiled on one supply reel 104. One of skill in the art will recognize other configurations for supply reels 104 from which a carrier 102 with prongs 116 may be uncoiled.

The system 100 includes a take-up reel 106 configured to coil the carrier 102, the prongs 116, and the manufactured part 108 formed on the prongs 116 while maintaining orientation of the manufactured part 108 with respect to the carrier 102. In one embodiment, maintaining orientation includes holding the manufactured part 108 in a fixed position with respect to the uncoiled carrier 102. Position may be maintained by forming the manufactured part 108 onto the prongs 116 while the prongs 116 are attached to the carrier 102. In one embodiment, orientation of the manufactured part 108 may be altered while the carrier 102 is coiled onto the take-up reel 106, but may be restored when the carrier 102 is uncoiled from the take-up reel 106.

The take-up reel 106 may accommodate one or more carriers 102 with at least one manufactured part 108 formed onto prongs 116 of the carriers 102. Take-up reels 106 may come in various sizes and dimensions to accommodate various manufactured parts 108. In one embodiment, a one take-up reel 106 is positioned to coil a carrier 102 and manufactured parts 108. In another embodiment, multiple take-up reels 106 are used to coil one or more carriers 102 with attached manufactured parts 108. In another embodiment, the system 100 does not include a take-up reel 106, but instead feeds the carrier 102 and attached manufactured parts 108 into one or more manufacturing machines 110 used for further processing. Further processing may include assembly, painting, silk screening, plating, or trimming the manufactured parts 108 from the prongs 116. One of skill in the art will recognize other forms of one or more take-up reels 106 used to coil a carrier 102 with attached manufactured parts 108 or systems 100 without a take-up reel 106.

The system 100 includes a manufacturing machine 110 used by a manufacturing process to form a manufactured part 108. The manufacturing machine 110 may comprise one machine or may include two or more machines. The manufacturing machine 110 may use an injection molding process, a cast metal process, a stamped metal process, or the like and may form a manufactured part 108 using a mold or dye 114. For example, in an injection molding process, the manufacturing machine 110 forms a manufactured part 108 by clamping parts of a mold 114 together and injecting hot plastic or another suitable material into the mold 114. The manufacturing machine 110 then opens the mold 114 and the manufactured part 108 comes free of the mold 114. In another example, the manufacturing machine 110 clamps parts of a mold 114 together and injects molten metal to form a manufactured part 108. In yet another example, the manufacturing machine 110 uses some type of a dye 114 and stamps metal to form a manufactured part 108.

In one embodiment, the at least one supply reel 104 the take-up reel 106 are positioned vertically with respect to the manufacturing machine 110. For example, a supply reel 104 may be positioned below the mold 114 of a manufacturing machine 110 and the take-up reel 106 may be positioned above the manufacturing machine 110, as depicted in FIG. 1A. In another embodiment, the supply and take-up reels 104, 106 are positioned to the sides of a manufacturing machine 110. In another embodiment, a reel 104, 106 is located above or below a manufacturing machine 110 and another reel 104, 106 is position to the side of a manufacturing machine 110. In one embodiment, a take-up reel 106 becomes a supply reel 104 for a process or sub-process following the process to form a manufactured part 108. One of skill in the art will recognize other manufacturing machines 110 capable of forming a manufactured part 108 in conjunction with a system 100 to maintain orientation of a manufactured part 108 during a manufacturing process and other locations of supply and take-up reels 104, 106.

The system 100, in one embodiment, includes a reel holder assembly 112 that positions the at least one supply reel 104 on one side of the manufacturing machine 110 and to position the take-up reel 106 on a second side of the manufacturing machine 110. In one embodiment, a supply reel 104 is connected to one reel holder assembly 112 and a take-up reel 106 is connected to another reel holder assembly 112. The reel holder assembly 112 may position a reel 104, 106 on any side of a manufacturing machine 110 including above, below or horizontally to the side. The reel holder assembly 112 may allow a reel 104, 106 to spin freely, or may be attached to a mechanism that turns a reel 104, 106.

In one embodiment, one reel 104, 106 spins freely and another reel 104, 106 is turned by a drive mechanism. A drive mechanism may comprise a motor, a cogged drive wheel, a belt, and the like. In one embodiment, the reel holder assembly 112 positions multiple supply reels 104. In another embodiment, the reel holder assembly 112 positions multiple take-up reels 106. In yet another embodiment, the reel holder assembly 112 includes guides, wheels, positioners, and the like to help control a position of a carrier 102 with respect to reels 104, 106 and/or the manufacturing machine 110. Part of a reel holder assembly 112 may be part of the manufacturing machine 110. One of skill in the art will recognize other forms of a reel holder 112 to position reels 104, 106 with respect to the manufacturing machine 110.

Beneficially, the system 100 for maintaining orientation of a manufactured part 108 during a manufacturing process overcomes some or all of the deficiencies of the prior art. The system 100 provides a convenient way to maintain orientation of manufactured parts 108 for each stage of a manufacturing process without requiring manual placement by workers or mechanical placement by expensive positioning equipment. The system 100 may be less expensive than other methods and systems for repositioning manufactured parts 108 after initial creation of the manufactured parts 108.

Figure 2A:
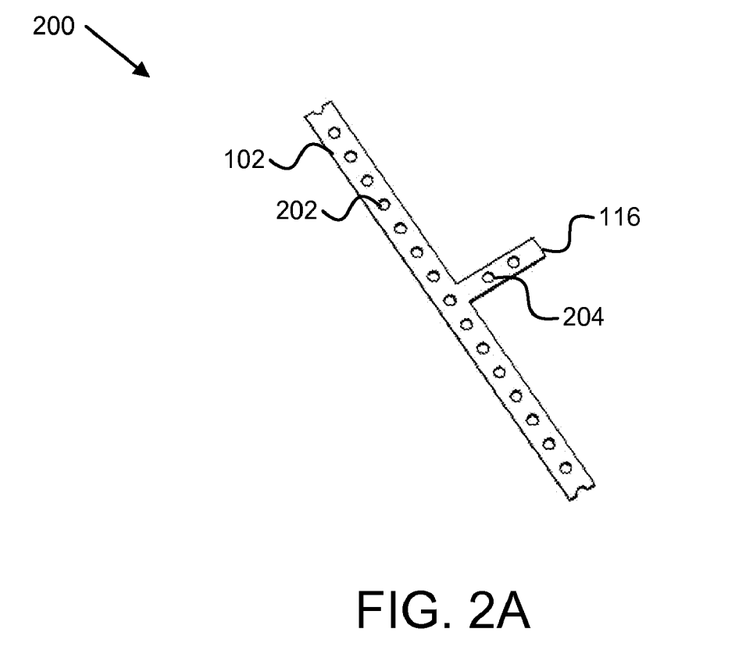
FIG. 2A is a schematic block diagram illustrating a view of a portion of one embodiment of an apparatus for maintaining orientation of a manufactured part during a manufacturing process in accordance with the present invention.
Figure 2B:
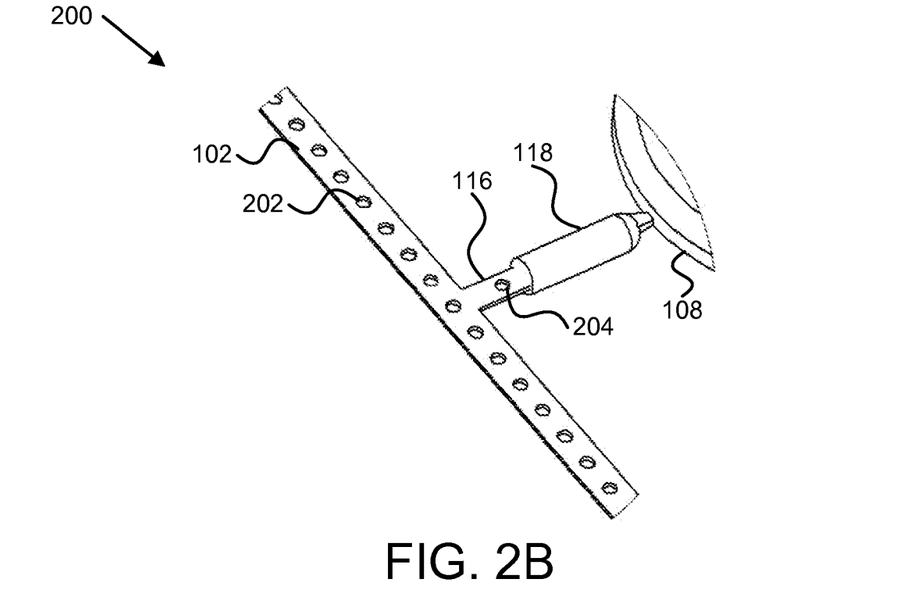
FIG. 2B is a schematic block diagram illustrating another view of a portion of one embodiment of an apparatus for maintaining orientation of a manufactured part during a manufacturing process in accordance with the present invention.

FIGS. 2A and 2B comprise a schematic block diagram illustrating one embodiment of an apparatus 200 for maintaining orientation of a manufactured part 108 during a manufacturing process in accordance with the present invention. FIGS. 2A and 2B each include a portion of the apparatus 200. The apparatus 200 includes a carrier 102, at least one prong 116 protruding from the carrier 102, a manufactured part 108, and a connector 118, substantially similar to those described in relation to the system 100 described in FIGS. 1A, 1B, and 1C. The apparatus 200, in one embodiment, includes indexing holes 202 and prong holes 204, which are described below.

The apparatus 200 includes an indexing mechanism configured to facilitate advancing the carrier 102 to a predetermined location in the manufacturing machine 110 to form the manufactured part 108 onto at least one prong 116. The indexing mechanism, in one embodiment, comprises one or more indexing holes 202 in the carrier 102. The indexing holes 202 may be round, square, rectangular, oblong, or any other shape that facilitates indexing. For example, a round indexing hole 202 may be used by a drive wheel attached to an encoder to determine a position of the carrier 102. A drive wheel may comprise a mechanical wheel of a fixed diameter and with cogs or other protrusions extending from the wheel to engage the indexing holes 202 of the carrier 102. A shaft may be attached to the wheel. An encoder or another sensor determines angular rotation of the drive wheel. An advancing mechanism may be tied to the encoder or sensor.

As the advancing mechanism advances the carrier 102 into the manufacturing machine 110, the carrier 102 causes the drive wheel to turn and when the sensor determines that the carrier 102 has advanced to the predetermined location in the manufacturing machine 110, the advancing mechanism stops the carrier 102 to allow the manufacturing machine 110 to form a manufactured part 108 onto prongs 116 of the carrier 102. After the manufactured part 108 is completed, the manufacturing machine 110 advances the carrier 102 so that one or more additional prongs 116 are moved to the pre-determined location in the manufacturing machine 110. Indexing holes 202 of different shapes may be included on the same carrier 102. For example, rectangular holes may be used by a cog or other device to advance the carrier 102 while round holes may be used by a drive wheel. One of skill in the art will recognize other indexing mechanisms and other indexing holes 202 to control advancement of the carrier 102 into the manufacturing machine 110.

The apparatus 200, in another embodiment, includes prong holes 204 in the prongs 116. Prong holes 204, in one embodiment, may be used as indexing holes 202. In another embodiment, prong holes 204 may be used to secure a manufactured part 108 to a prong 116. For example a connector 118 formed around a prong 116 with a prong hole 204 may be more secure than a connector 118 formed around a prong 116 without a prong hole 204. In another example, a manufactured part 108, formed using a stamped metal or other process, may push a metal prong through the prong hole 204. One of skill in the art will recognize other uses for a prong hole 204 in a prong 116 protruding from a carrier 102.

Figure 3:
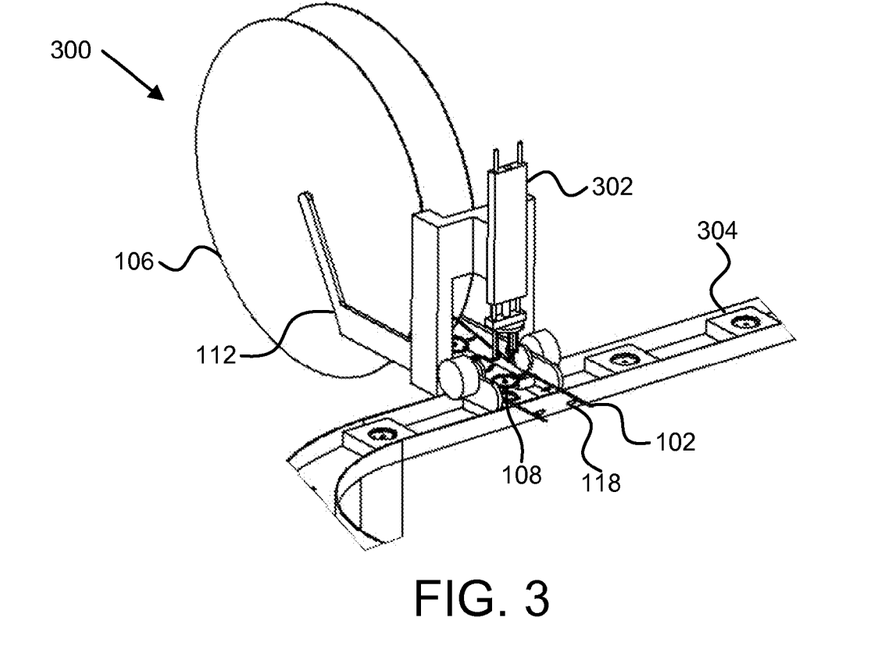
FIG. 3 is a schematic block diagram illustrating an embodiment of an apparatus for maintaining orientation of a manufactured part during a manufacturing process in a trimming and placing process in accordance with the present invention.

FIG. 3 is a schematic block diagram illustrating an embodiment of an apparatus 300 for maintaining orientation of a manufactured part 108 during a manufacturing process in a trimming process in accordance with the present invention. The apparatus 300 includes a carrier 102, a take-up reel 106, a reel holder assembly 112, prongs 116 (not shown), a manufactured part 108, and connectors 118, substantially as described in relation to FIGS. 1A, 1B, 1C, 2A, and 2B. The apparatus 300 also includes a trimming and placement assembly 302 and, in one embodiment, a trimming and placement assembly 302 may be attached to some sort of conveyer assembly 304, which are described below. The conveyor assembly 304 may also be an indexing turn-table or other apparatus to transport parts from station to station.

The apparatus 300, in one embodiment, includes a trimming and placement assembly 302 that trims manufactured parts 108 from a carrier 102. For example, a take-up reel 106 with a coiled carrier 102 with attached manufactured parts 108 may be loaded onto a reel holder assembly 112 and the carrier 102 fed into a trimming and placement assembly 302. The trimming and placement assembly 302 may include an indexing mechanism. As manufactured parts 108 are fed into the trimming and placement assembly 302, the trimming and placement assembly 302 may trim manufactured parts 108 from the carrier 102, prongs 116, and connectors 118. In one embodiment, the trimming and placement assembly 302 allows the trimmed manufactured parts 108 to fall into a bin after trimming. In another embodiment, the trimming and placement assembly 302 places manufactured parts 108 into a packaging assembly to package the manufactured parts 108 by allowing them to fall into a package or by mechanically placing the manufactured parts 108 in a package.

In anther embodiment, the trimming and placement assembly 302 trims the manufactured parts 108 from the carrier 102, prongs 116, and connectors 118 and places the manufactured parts 108 on a conveyer assembly 304. The trimming and placement assembly 302 may place the manufactured part 108 by allowing the parts 108 to fall or by mechanically moving the part 108 to the conveyer assembly 304. The conveyer assembly 304 may include an assemblies of other parts, sub-assemblies, etc. so that the trimming and placement assembly 302 places the manufactured parts 108 onto the assemblies, sub-assemblies, etc. in a correct orientation as part of an assembly line. Beneficially, the apparatus 300 and system 100 allow placement of a manufactured part 108 correctly onto a conveyer assembly 304 while maintaining orientation of the manufactured part 108.

Figure 4:
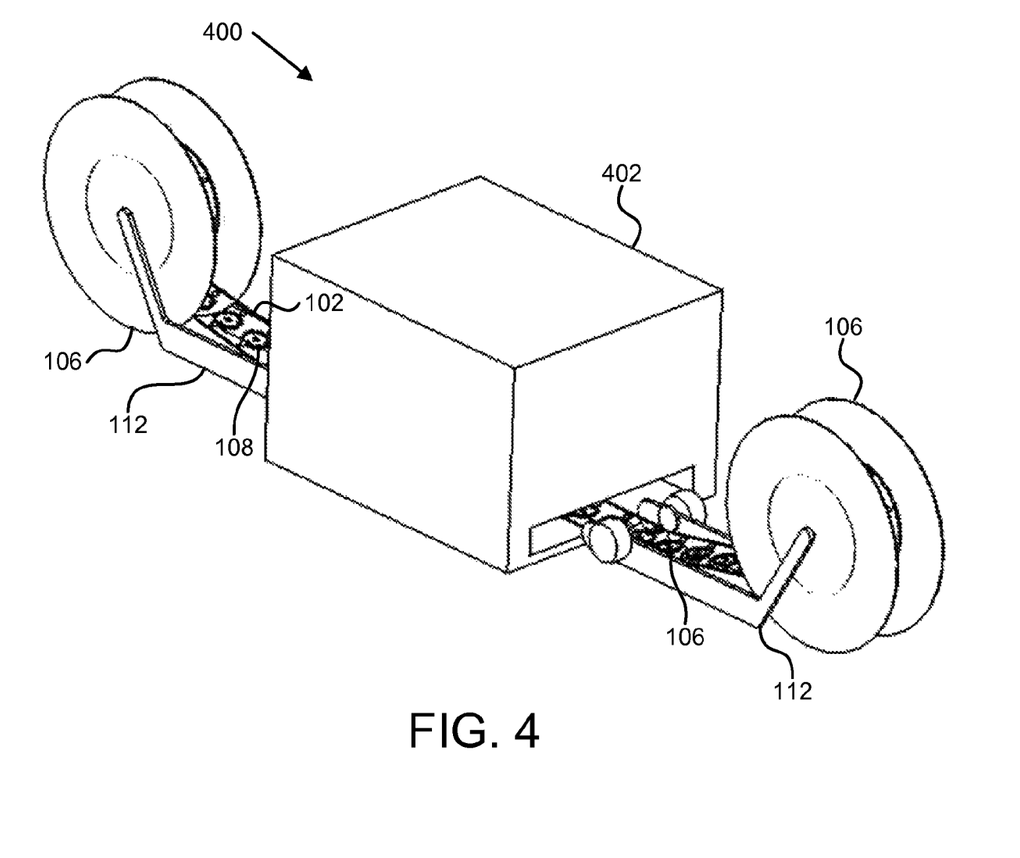
FIG. 4 is a schematic block diagram illustrating an embodiment of an apparatus for maintaining orientation of a manufactured part during a manufacturing process in a second processing step in accordance with the present invention.

FIG. 4 is a schematic block diagram illustrating an embodiment of an apparatus 400 for maintaining orientation of a manufactured part 108 during a manufacturing process in a second processing step in accordance with the present invention. The apparatus 400 includes a carrier 102, at least one take-up reel 106, a reel holder assembly 112, prongs 116 (not shown), a manufactured part 108, and connectors 118 (not shown), substantially as described in relation to FIGS. 1A, 1B, 1C, 2A, and 2B. The apparatus 400 also includes a second manufacturing machine 402 for further processing of the manufactured part 108. The further processing may be a silk screening process, a painting process, a plating process, an assembly process, a machining process, or any other processing step suitable for a carrier 102 with attached manufactured parts 108. The further processing may include several processing steps and machines.

The second manufacturing machine 402 may include an indexing mechanism and may advance the carrier 102 with attached manufactured parts 108 into the second manufacturing machine 402 in much the same way that the manufacturing machine 110 advances the carrier 102 to form manufactured parts 108. Beneficially, a carrier 102 with attached manufactured parts 108 that maintain orientation with the carrier 102 allows a second manufacturing machine 402 to silk screen a logo onto a manufactured part 108, paint or plate a particular section of a manufactured part 108, place the manufactured part 108 into an assembly, and the like without having to reorient the manufactured part 108 at each processing step.

FIG. 5 is a schematic flow chart diagram illustrating one embodiment of a method 500 for maintaining orientation of a manufactured part 108 during a manufacturing process in accordance with the present invention. The method 500 begins 502 and the manufacturing machine 110 uncoils 504 the carrier 102 from at least one supply reel 104. In one embodiment, the manufacturing machine 110 uses an indexing mechanism to advance the carrier 102 and to uncoil 504 the carrier 102 from one or more supply reels 104. The manufacturing machine 110 feeds 506 the carrier 102 into the manufacturing machine 110 to form a manufactured part 108. The manufacturing machine 110 forms 508 the manufactured part 108 onto at least one prong 116 protruding from the carrier 102 and the method 500 ends 510. The one or more prongs 116 attached to the manufactured part 108 maintain orientation of the manufactured part 108 with respect to the carrier 102. In another embodiment, the system 100 for maintaining orientation of a manufactured part 108 uncoils 504 the carrier 102 or feeds 506 the carrier 102 into the manufacturing machine 110.

FIG. 6 is a schematic flow chart diagram illustrating another embodiment of a method 600 for maintaining orientation of a manufactured part 108 during a manufacturing process in accordance with the present invention. The method 600 begins 602 and the manufacturing machine 110 uncoils 604 the carrier 102 from at least one supply reel 104. In one embodiment, the manufacturing machine 110 uses an indexing mechanism to advance the carrier 102 and to uncoil 604 the carrier 102 from one or more supply reels 104. The manufacturing machine 110 feeds 606 the carrier 102 into the manufacturing machine 110 to form a manufactured part 108. The manufacturing machine 110 forms 608 the manufactured part 108 onto at least one prong 116 protruding from the carrier 102. The one or more prongs 116 attached to the manufactured part 108 maintain orientation of the manufactured part 108 with respect to the carrier 102. Optionally, the manufacturing machine 110 coils 610 the carrier 102 with attached manufactured parts 108 onto a take-up reel 106.

If the method 600 determines 612 there is another step of the manufacturing process, a second manufacturing machine 402 feeds 614 the carrier 102 with attached manufactured parts 108 into another manufacturing machine 402 for processing. Optionally, the manufacturing machine 402 coils 616 the carrier 102 with attached manufactured parts 108 onto a take-up reel 106 and the method 600 returns to determine 612 if there is another manufacturing process. In one embodiment, the manufacturing machine 402 feeds 614 the carrier 102 with attached manufactured parts 108 from one manufacturing machine 110, 402 to the next without coiling the carrier 102 onto a take-up reel 106. If the method 600 determines 612 there are no more manufacturing processes, the trimming and placement assembly 302 trims 618 the manufactured parts 108 from the carrier 102 and the method 600 ends 620. The trimming and placement assembly 302 may allow manufactured parts 108 into a bin, place manufactured parts 108 onto a conveyer assembly 304, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for maintaining orientation of a manufactured part during a manufacturing process, the method comprising:
   uncoiling a carrier from at least one supply reel, the carrier comprising a plurality of prongs protruding from the carrier, the carrier and the plurality of prongs configured to support a plurality of manufactured parts, the carrier and the plurality of prongs formed independent of the manufactured parts;
   feeding the carrier and at least one prong of the plurality of prongs into a manufacturing machine used by a manufacturing process to form at least a portion of a manufactured part from the plurality of manufactured parts, the carrier and the at least one prong being free from any portion of the manufactured part prior to being fed into the manufacturing machine; and forming the at least a portion of the manufactured part onto the at least one prong protruding from the carrier such that raw material used to form the manufactured part is molded around the at least one prong when the manufacturing machine forms the at least a portion of the manufactured part, wherein a portion of the raw material attaches to the at least one prong, the at least one prong and the carrier maintaining orientation of the manufactured part with respect to a portion of the carrier from which the at least one prong protrudes.

2. The method of claim 1, further comprising coiling the carrier, the at least one prong, and the manufactured part formed onto the at least one prong onto a take-up reel, the take-up reel configured to accommodate the carrier, the at least one prong, and the manufactured part while maintaining orientation of the manufactured part with respect to the carrier.

3. The method of claim 1, wherein at least a portion of the manufacturing process comprises an injection molding process.

4. The method of claim 1, wherein at least a portion of the manufacturing process comprises a cast metal process.

5. The method of claim 1, wherein the carrier comprises a top carrier and a bottom carrier and the top and bottom carriers each comprise at least one prong protruding from the carriers.

6. The method of claim 5, wherein the top carrier uncoils from a first supply reel and the bottom carrier uncoils from a second supply reel.

7. The method of claim 5, wherein the top carrier and the bottom carrier uncoil from one supply reel.

8. The method of claim 5, wherein the manufactured part is formed on at least one prong protruding from the top carrier and at least one prong protruding from the bottom carrier.

9. The method of claim 1, wherein the carrier comprises any of a wire, a metal strip, a cardboard strip, a plastic strip, a polymeric material, and a cloth strip.

10. The method of claim 1, wherein the carrier further comprises an indexing mechanism configured to facilitate advancing the carrier to a predetermined location in the manufacturing machine to form the manufactured part onto at least one prong.

11. The method of claim 10, wherein the indexing mechanism comprises one or more indexing holes in the carrier, wherein the indexing holes are used by a drive wheel.

12. The method of claim 1, wherein the portion of the raw material that attaches to the at least one prong is a connector, wherein the connector is formed as a piece of the manufactured part that forms around the prong.

13. The method of claim 1, further comprising uncoiling the carrier, the at least one prong, and the manufactured part into a second manufacturing machine for further processing of the manufactured part.

14. The method of claim 13, wherein the further processing comprises any of a silk screening process, a painting process, a plating process, a machining process and an assembly process.

15. The method of claim 1, further comprising uncoiling the carrier, the at least one prong, and the manufactured part into a trimming and placement assembly configured to trim the manufactured part from the carrier and at the least one prong and places the manufactured part.

* * * * *